US005699700A

United States Patent [19]

Carmien

[11] Patent Number: 5,699,700
[45] Date of Patent: Dec. 23, 1997

[54] HAND TOOL AND PROCESS FOR MANUFACTURING SAME

[76] Inventor: Joseph Allen Carmien, 525 N. Maple Dr., Beverly Hills, Calif. 90210

[21] Appl. No.: 691,746

[22] Filed: Aug. 2, 1996

Related U.S. Application Data

[63] Continuation-in-part of Ser. No. 372,437, Jan. 11, 1995, abandoned.

[51] Int. Cl.[6] .................................................. B21H 7/02
[52] U.S. Cl. .......................... 76/113; 29/525.12; 29/527.1; 294/57; 403/266
[58] Field of Search ........................... 30/340, 342, 122; 76/101.1, 109, 111, 113; 29/525.12, 525.01, 525.02, 527.1, 527.3; 16/114 R; 403/266, 267, 269; 294/49, 57; 172/371

[56] References Cited

U.S. PATENT DOCUMENTS

| Re. 32,364 | 2/1987 | Carmien | 294/57 |
|---|---|---|---|
| 206,122 | 7/1878 | Nixon | 172/371 |
| 641,422 | 1/1900 | Blundell . | |
| 657,422 | 9/1900 | Judd . | |
| 1,218,145 | 3/1917 | Whittier . | |
| 1,374,336 | 4/1921 | Surbaugh . | |
| 1,755,236 | 4/1930 | Brandenburg . | |
| 2,031,556 | 2/1936 | Brandenburg . | |
| 2,063,774 | 12/1936 | Washington . | |
| 2,238,104 | 4/1941 | Finley . | |
| 2,960,230 | 11/1960 | Fracker . | |
| 3,009,726 | 11/1961 | Duppengiesser | 294/57 |
| 3,549,189 | 12/1970 | Alosi . | |
| 4,050,727 | 9/1977 | Bonnes | 294/49 |
| 4,451,073 | 5/1984 | Carmien . | |
| 4,570,988 | 2/1986 | Carmien | 294/57 |
| 4,605,254 | 8/1986 | Carmien . | |
| 4,718,708 | 1/1988 | Zacuto | 294/57 |
| 5,097,909 | 3/1992 | Jauhal et al. . | |
| 5,123,304 | 6/1992 | Carmien | 76/111 |
| 5,141,353 | 8/1992 | Meredith et al. | 403/267 |
| 5,213,014 | 5/1993 | Carmien | 76/163 |
| 5,310,230 | 5/1994 | Carmien | 294/49 |

FOREIGN PATENT DOCUMENTS 1 376 180  12/1974  United Kingdom .
2 118 431  11/1983  United Kingdom .

Primary Examiner—Douglas D. Watts
Attorney, Agent, or Firm—Kelly Bauersfeld Lowry & Kelley, LLP

[57] ABSTRACT

A process for manufacturing a hand tool includes the steps of assembling a tool handle to a molded composite handle adapter to form a tool handle assembly, and attaching the assembly to a tool head utilizing removable fasteners. The tool handle assembly is formed by utilizing a portion of the tool handle as an insert in the mold for the handle adapter. A handle receiving socket is formed during the molding process around the inserted end of the tool handle shaft, to securely fasten the tool handle to the handle adapter. The handle adapter has an enlarged base that is seated on a platform of the tool head. Threaded fasteners, such as machine screws, are received within the handle adapter and locked in place to attach a tool handle assembly to the tool head. A shim may be disposed between the tool head and the handle adapter to facilitate use of the tool handle assembly with a number of different tool heads.

13 Claims, 2 Drawing Sheets

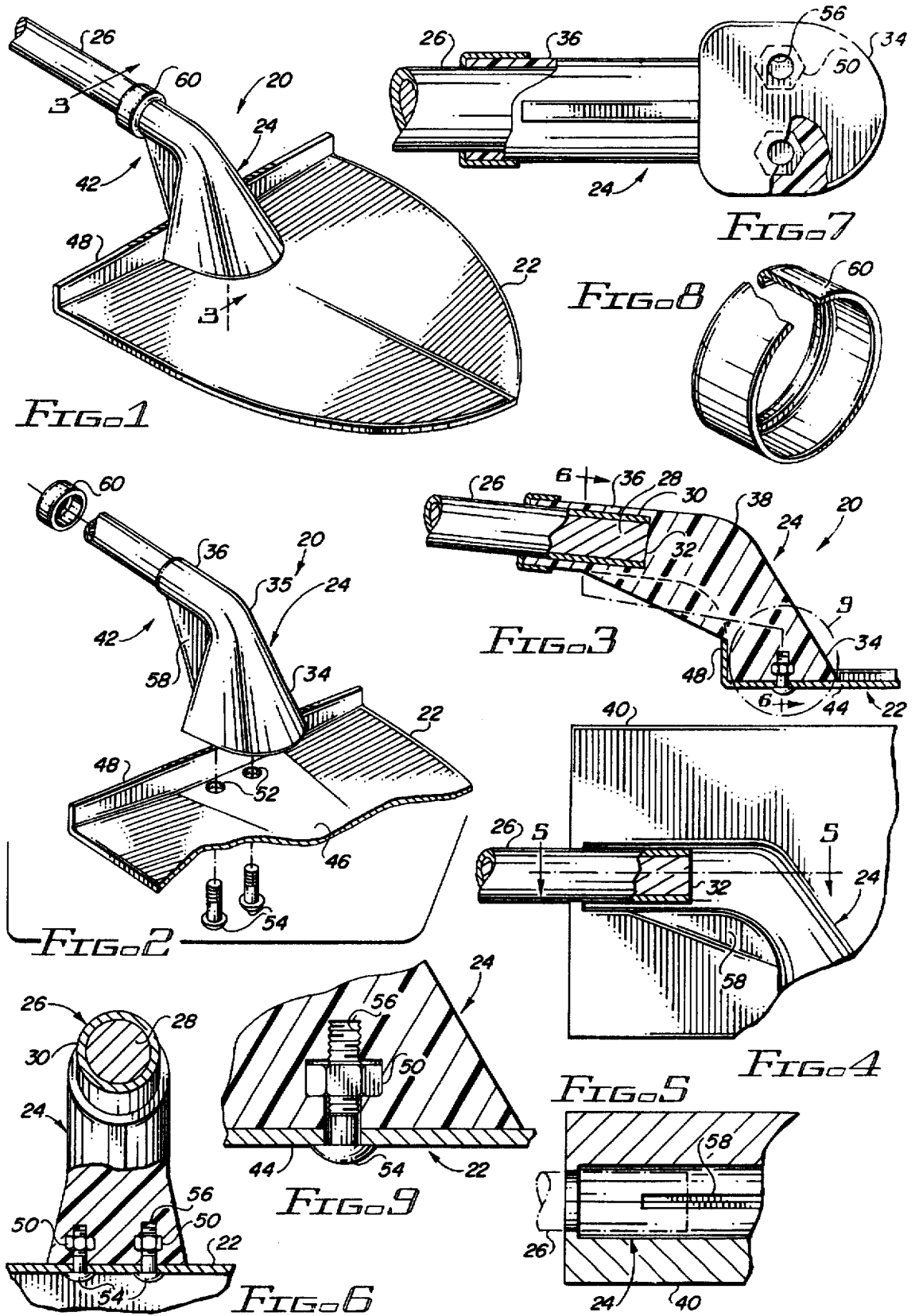

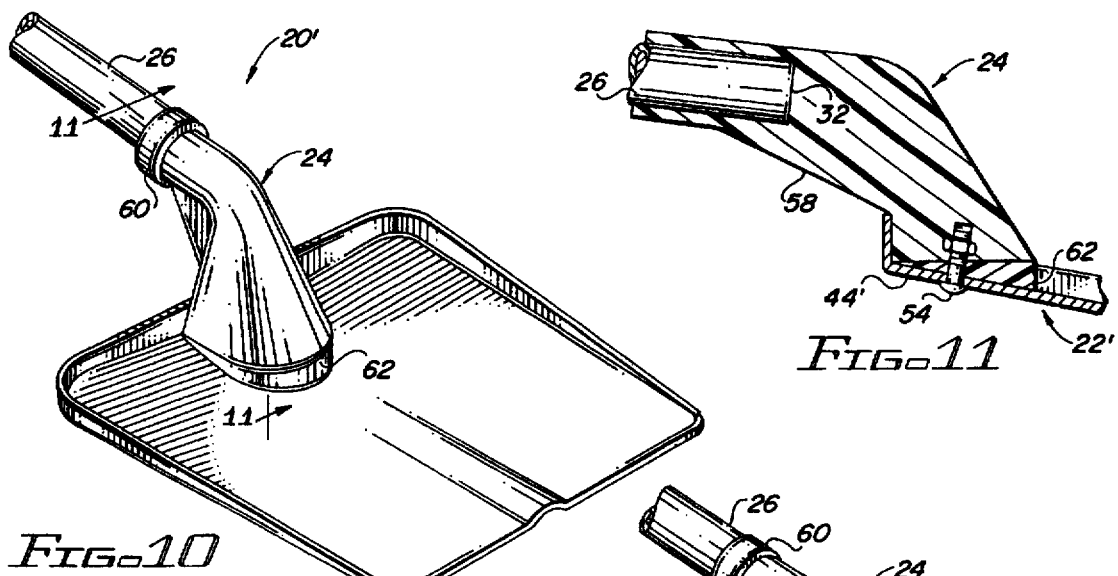
FIG. 10
FIG. 11
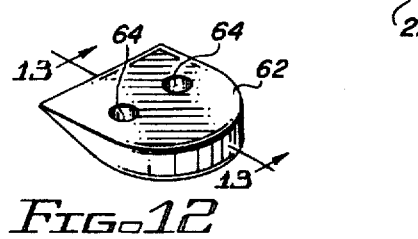
FIG. 12
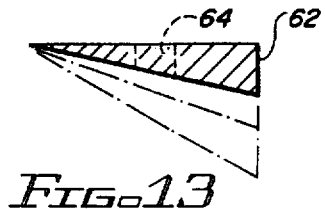
FIG. 13
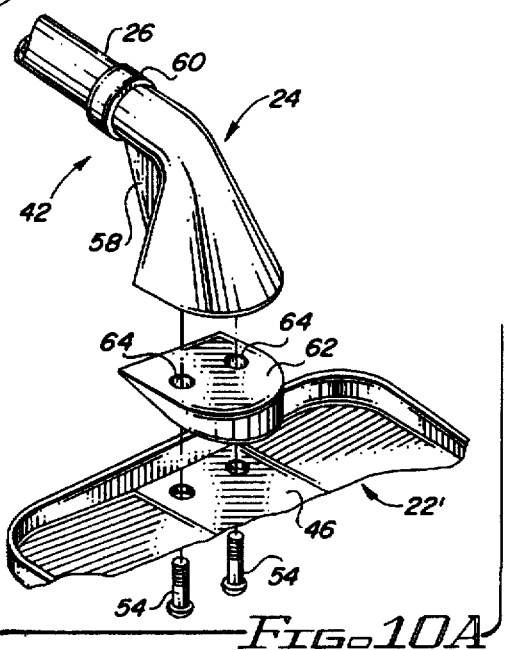
FIG. 10A
FIG. 14
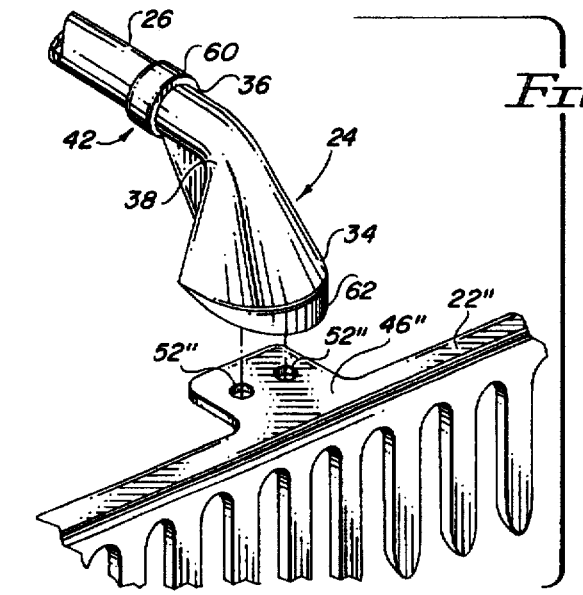
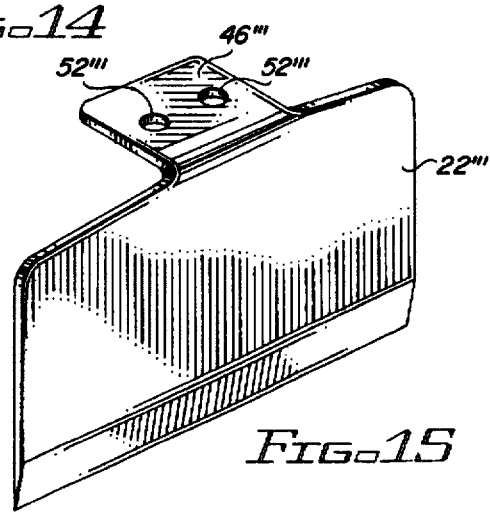
FIG. 15

HAND TOOL AND PROCESS FOR MANUFACTURING SAME

RELATED APPLICATION

This is a continuation-in-part of U.S. patent application Ser. No. 08/372,437, filed Jan. 11, 1995 and entitled SHOVEL WITH COMPOSITE SOCKET AND PROCESS FOR MANUFACTURING SAME, now abandoned.

BACKGROUND OF THE INVENTION

This invention relates generally to hand tools. More specifically, the present invention relates to a process for manufacturing hand tools such as shovels rakes, hoes and the like, utilizing a composite adapter to attach a tool handle to the tool head.

With the advent of the technology of forging steel billets into hand tools, the highest quality shovel blade was made by heating a billet of steel and hammering it into a form that provided a blade appropriately styled to scoop or dig earth. Because the blade was forged, the attack edge could be made appropriately thin, and as the blade progressed back towards the handle, it could be made thicker to give the blade the amount of stiffness and strength required in the use of the shovel. Originally, emanating from the center of the back or rear edge of the shovel blade, was a tang (as opposed to a socket) similar to the tangs commonly used today in rakes and hoes. The tang was subsequently jammed into a hole in a wooden handle, and an appropriate steel sleeve was provided over the end of the handle to provide the breakout resistance strength required.

The forged shovel, to this day, is the top of the line for a number of reasons. Such shovels have blades which provide a relatively thin, sharp attack edge, that thicken out as the blade approaches a rear edge to provide stiffness and strength, and which provide a substantially flat surface on the underside of the blade to preclude the collecting of mud and clay. Further, forged shovels usually accommodate a good-sized tread on which the workman's foot can comfortably step, and may be reinforced by having extra steel in those areas of the blade surrounding the handle-engaging tang.

Over the years evolution and competition have brought about the manufacture of shovel blades from flat, cold-rolled sheet steel, which could be produced at a fraction of the labor costs of the forged blades. However, many concessions were made in the design of such newer stamped blades, which the marketplace has accepted because of the substantially lower costs of these blades notwithstanding their inferior characteristics.

For example, in modern stamped shovel blades, the back end of the dish is formed into a standing rib to provide a minimum acceptable level of stiffness. In contrast, the forged blade typically included more massive steel located in that location. By creating a standing rib in modern shovel blades to provide stiffness, a corresponding hollow is created on the underside of the blade which traps mud and clay. In more demanding applications, a flat plate is welded over the backside of the shovel indentation to simulate the "closed" back of the forged shovel. This is a problem addressed in U.S. Pat. Nos. 5,213,014 and 5,310,230 the contents of which are incorporated herein.

Further, to economize on the manufacturing operation, the original blank of the stamped blade includes a projection which when rolled into a circle provides a socket for the shovel handle. At the transition from the socket created for acceptance of the handle and the tread on which the workman's foot must rest, there is but the one thickness of the original steel sheet. This area of stamped blades is known to be a weak point which fails and rips when the shovel is heavily loaded. Moreover, since the socket circle or ring is not ordinarily locked in a closed position by welding, a hole is drilled in it to accept a rivet which provides the attachment for the handle in the socket and to keep the ring or circle closed. Furthermore, because the blade and socket are all made from one stamped piece of sheet steel, the area between the end of the shovel handle and the handle socket as it meets the blade should be filled with something (usually a piece of wood) to keep it from collapsing, which may occur when the shovel is used as a pry. This particular problem is addressed in U.S. Pat. No. Re. 32,364, the contents of which are incorporated herein.

From the foregoing it is readily seen that when industry attempted to reduce the cost of a shovel going from the forged model to the stamped model, a great number of concessions were made which the public has learned to accept. In addition to those noted above, a further concession in the stamped shovel has been the continuing extension of the socket length to accommodate a decline in the grade of wood available for handles. This, of course, compounds the concessions by using more steel and having a greater amount of scrap—that portion of the blank that is thrown away outboard on either side of the socket in its flat pattern.

Current lawn and garden hand tools such as rakes, hoes, shovels, scoops, scrapers and the like, which utilize a wood handle attached to a metal tool head, have a cost distribution of about seventy percent of the total cost which is in the tool head and about thirty percent of the total cost which is in the handle. Typically the tool head outlasts the wood handle, and thus there has been a market for replacement tool handles for any given tool head.

With the development of composite tool handles, particularly the fiberglass handle, two things have occurred: the handle almost always outlasts the steel tool head; and the cost of the handle as opposed to the blade is now in the order of magnitude of sixty percent and the blade forty percent. It therefore makes sense to provide replacement blades (rather than replacement handles as was the case previously), which have a cost reduced to the lowest possible level.

Accordingly, there has been a need for an improved shovel design which utilizes the advantages inherent in stamped shovel blades, but eliminates the concessions in strength and durability in comparison with forged blades. Such a shovel would preferably permit the shovel blade to be produced using roughly half the area of the sheet metal stock typically required in the manufacture of conventional stamped shovel blades. Further, the improved shovel should provide a shovel blade having an improved and increased step or tread for the workman's foot, which may also serve as a stiffening member for the shovel blade itself, and provide for attachment of the handle at a point on the blade which will aid in the stiffness thereof and in dispersion of the load thereon. Moreover, such a shovel should have a substantially flat back surface for the shovel blade, to eliminate any mud and clay trap or the need to add a frog or cover. Additionally, there is a need for a novel hand tool construction and process for manufacturing hand tools which permits the same composite tool handle assembly to be utilized on a number of different tool heads, including shovel blades. Such hand tool construction should maximize the strength of the tool handle assembly and yet minimize the effort needed to assemble and disassemble a tool head thereto. The present invention fulfills these needs and provides other related advantages.

SUMMARY OF THE INVENTION

The present invention resides in an improved process for manufacturing hand tools such as a shovel, hoe, fork, rake or the like. The process comprises the steps of, generally, molding a handle receiving socket of a handle adapter about an end of a tool handle, and attaching the handle adapter to a tool head.

In a preferred form of the invention, the tool head is first stamped from sheet metal stock. A portion of the tool handle is inserted into a mold for the handle adapter, and then the handle adapter is molded within the mold to form a handle receiving socket about the end of the tool handle and a base portion having a threaded recess therein. The handle adapter is then attached to the tool head utilizing a fastener that is turned into the threaded recess of the base portion. In this regard, the threaded recess is smaller in cross-section than the threaded fastener so as to lock the fastener therein.

The tool handle assembly, comprising the tool handle and the handle adapter, may be interchangeably attached to several different types of tool handles. By simply removing the threaded fastener(s) from the recess(es) in the handle adapter, the tool handle assembly and the tool head may be disassociated and the tool handle assembly subsequently attached to a different tool head as circumstances might warrant. In order to change the relative orientation of the tool handle relative to the tool head, a shim may be disposed between the handle adapter and the tool head prior to the attaching step.

The resultant hand tool comprises a substantially flat tool head, i.e., a shovel blade, having a planar platform on an upper surface thereof, and a foot tread extending the width of a rear edge of the blade. An enlarged base at a first end of the molded composite handle adapter is seated on the planar platform of the blade. Fasteners extending through the blade and into the base mechanically engage nuts within the handle adapter base to connect the base to the blade.

Other features of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a partially fragmented top, front and right side perspective view of a shovel embodying the invention;

FIG. 2 is an exploded perspective view similar to FIG. 1, illustrating the several components of the shovel;

FIG. 3 is an enlarged fragmented sectional view taken generally along the line 3—3 of FIG. 1;

FIG. 4 is a schematic representation illustrating the step of utilizing a composite tool handle as an insert in a mold around which a handle adapter is molded in accordance with the process for creating a tool handle assembly embodying the invention;

FIG. 5 is a sectional view taken generally along the line 5—5 of FIG. 4;

FIG. 6 is an enlarged, fragmented and partially sectional view taken generally along the line 6—6 of FIG. 3;

FIG. 7 is a bottom plan view, in a partial section, of the tool handle assembly shown in FIG. 2;

FIG. 8 is an enlarged perspective view of a collar;

FIG. 9 is an enlarged, fragmented sectional view of the area indicated by the number 9 in FIG. 3;

FIG. 10 is a partially fragmented top, front and right side perspective view of another hand tool embodying the invention, utilizing the same tool handle assembly as that shown in FIGS. 1–9 attached to a different tool head with an intermediate shim;

FIG. 10A is an exploded perspective view similar to FIG. 10, illustrating the several components of the hand tool;

FIG. 11 is an enlarged fragmented sectional view taken generally along the line 11—11 of FIG. 10;

FIG. 12 is a perspective view of the shim shown in FIGS. 10–11;

FIG. 13 is a sectional view taken generally along the line 13—13 of FIG. 12;

FIG. 14 is an exploded perspective view illustrating attachment of the handle assembly and shim of FIGS. 10–13 to another tool head to form a rake; and FIG. 15 illustrates yet another tool head that may be utilized in connection with the present invention to form a hoe.

DETAILED DESCRIPTION OF THE PREFERRED EMBODIMENTS

As shown in the drawings for purposes of illustration, the present invention is concerned with an improved hand tool, generally designated in the accompanying drawings by the reference numbers 20 and 20'. During the following description, component parts of different embodiment of the invention which have the same functional and/or structural characteristics will be differentiated by prime (', ", "') symbols.

In accordance with the present invention, the hand tool 20, illustrated as a shovel, comprises a substantially flat tool head or shovel blade 22, a molded composite handle adapter 24, and a tool handle 26. The tool handle 26 is preferably of the fiber-resin composite type as shown and described in U.S. Pat. Nos. 4,570,988 and 4,605,254, the contents of which are incorporated herein.

In manufacturing a typical fiber-resin composite tool handle 26, a fiber material is drawn through a resin bath and into a die tube where the resin is cured. As the fibers enter the die tube, alternating sections of a hollow tubing and a solid reinforcing core of a thermoplastic material are inserted into the center of the die tube and are simultaneously surrounded by the fibers and drawn into and through the die tube. By this method, a continuous hollow fiberglass rod can be quickly and easily manufactured with a reinforced thermoplastic section 28 provided at any location within a fiber-resin jacket 30, such as at an end 32 of the tool handle 26 to be attached to the handle adapter 24.

The handle adapter 24 is preferably molded of an engineering plastic such as a glass reinforced fiberglass, and includes an enlarged base 34 at a first end thereof, a handle receiving socket 36 at a second end thereof, and an angular intermediate portion 38. When molding the handle adapter 24, the end 32 of the tool handle 26 is inserted into a mold 40 for the handle adapter so that the handle receiving socket 36 is molded directly onto the inserted end 32 of the tool handle 26. In this manner the tool handle 26 is securely fixed to the handle adapter 24 within the handle receiving socket 36.

Utilizing this type of a molded connection between the tool handle 26 and the handle adapter 24 improves the flexural or cantilevered loading values of the resultant handle assembly 42 by as high as thirty percent in comparison with a fiberglass tool handle 26 either bonded by an adhesive or secured by means of a tang or connecting stud within the handle receiving socket 36. By way of explanation, as in any group of tendons such as wire cables, much higher performance is attained in its physical properties if the bundle of wire tendons is compressed together by means of a clamp as opposed to the tendons or cables being comparatively loose relative to one another. By placing the fiberglass pultrusion tool handle 26 in the mold 40 and having a liquified engineering plastic material molded around it to form the handle receiving socket 36, tremendous pressure is exerted in a compressive manner on the surrounded portion of the tool handle 26. This occurs because the plastic being molded at 400° F. to 500° F. shrinks between 0.005 and 0.008 inches per inch as it cools to ambient temperature. This cooling and shrinkage creates the continuing and lifetime pressure surrounding the end 32 of the tool handle 26 which is transmitted fiber by fiber throughout the whole bundle and, in effect, makes the surrounded end 32 of the tool handle 26 a solid mass as opposed to a bunch of tendons or individual glass fibers. Although the applied pressure doesn't enhance the glass fiber strength, it does place the resin (which constitutes approximately thirty percent of the fiber-resin jacket 30) under such great compression that its shear strength is substantially enhanced, which translates into a substantially higher flexural or bending strength in the tool handle 26.

The shovel blade 22 is preferably stamped from flat sheet metal stock into the configuration shown. The shovel blade 22 has a substantially flat shovel back 44 which simulates a "closed" back shovel, a planar platform 46 on an upper surface thereof, and a foot tread 48 extending the width of a rear edge of the blade. This particular configuration for the shovel blade 22 eliminates unacceptable flexing, bending or twisting of the shovel blade in use.

The handle adapter 24 is secured to the shovel blade 22 by placing a generally planar surface of the handle adapter base 34 against the planar platform 46 of the blade. Nuts 50 are molded within the handle adapter base 34, and apertures 52 are provided through the platform 46 and a portion of the base 34 through which bolts or machine screws 54 extend to engage the nuts 50 and connect the blade 22 and the handle adapter 34 together. In this regard, the nuts 50 are aligned within threaded recesses 56 in the base 34 of the handle adapter 24. When attaching the tool head 22 to the handle adapter 24, the bolts or machine screws 54 are turned through both the nuts 50 captured within the handle adapter 24, and the threads of the threaded recess 56. Due to shrinkage in the molded plastic material of the handle adapter 24, the threaded recesses 56 are smaller in cross-section than the threaded shafts of the machine screws 54. This serves to lock the machine screws 54 in place within the threaded recesses 56.

The attachment of the handle adapter 24 to the shovel blade 22 as illustrated moves the loads to be applied through the handle adapter to the shovel blade to the stiffest portion of the blade design. Further, the handle adapter 24 is molded to include a gusset 58 extending rearwardly from the intermediate portion 38 and between the base 34 and the handle receiving socket 36, to enhance the high strength characteristics of the handle adapter 24. A collar 60 may be provided at a suitable location on the tool handle 26 for aesthetic purposes.

The hand tool 20 comprising the handle assembly 42 fastened to the tool head 22 by means of the machine screws 54 provides convenient means for disassociating the tool head 22 from the handle assembly 42 and attaching a different type of tool head 22', 22" or 22'", to the same handle assembly 42. More particularly, if due to wear on the tool head 22 or other circumstances it was desired to replace the tool head 22 in the hand tool 20, all that need be done is simply remove the machine screws 54 from the nuts 50 and threaded recesses 56 in the base 34 of the handle adapter 24. The handle assembly 42, comprising the tool handle 26 and the handle adapter 24, could then be reattached to a new tool head utilizing the same machine screws 54. Under these circumstances, it is sometimes desirable to change the angular orientation of the tool handle 26 relative to the tool head or blade 22. Thus, a shim 62 (which may be simply a molded wedge) may be inserted between the platform (46', 46" or 46'") of the tool head (22', 22" or 22'") and the enlarged base 34 of the handle adapter 24. If the shim 62 has any substantial thickness, longer machine screws 54 may be needed than those used originally. The shim 62 is provided with parallel passageways 64 which are aligned with the apertures 52 and the threaded recesses 56.

From the foregoing it is to be appreciated that the shovel 20 of the present invention provides substantial improvements over standard stamped shovel designs by reducing the tool weight, eliminating the open back of the shovel blade, increasing the stiffness of the tool blade, improving the tread on which the workman presses his foot, reducing the amount of steel required for the blank, and improving the appearance of the shovel. More broadly, the process for manufacturing the hand tool 20 as disclosed herein provides a unique handle assembly 42 wherein the end 32 of the tool handle 26 has the handle receiving socket 36 of the handle adapter 24 molded thereabout, which not only provides a secure attachment of the tool handle 26 to the handle adapter 24, but also strengthens the end 32 of the tool handle in a manner greatly improving the flexural characteristics of the tool handle. Because the cross-section of the threaded recesses 56 is smaller than the machine screws 54, they serve to lock the machine screws 54 in place within the base 34 of the handle adapter 24 in a simple yet highly reliable manner. Moreover, the use of shims 62 between the base 34 and the platform 46 of the tool head 22 allows the angular orientation of the tool handle 26 to be varied with regard to the tool head 22.

Although several embodiments of the invention have been described in detail for purposes of illustration, various modifications may be made without departing from the spirit and scope of the invention. Accordingly, the invention is not to be limited, except as by the appended claims.

I claim:

1. A process for manufacturing a hand tool, comprising the steps of:

molding a handle receiving socket of a handle adapter about an end of a tool handle;

forming the handle adapter during the molding step, wherein the handle adapter includes the handle receiving socket at one end thereof and a base portion attachable to a tool head at another end, wherein during the forming step a threaded recess is provided in the base portion of the handle adapter; and attaching the handle adapter to a tool head, including the step of threading a fastener into the threaded recess.

2. The process of claim 1, wherein the threaded recess is smaller in cross-section than the threaded fastener so as to lock the fastener therein.

3. A process for manufacturing a hand tool, comprising the steps of:

molding a handle receiving socket of a handle adapter about an end of a tool handle;

attaching the handle adapter to a tool head; and inserting a shim between the handle adapter and the tool head prior to the attaching step.

4. The process of claim 1, wherein the molding step includes the steps of utilizing a portion of the tool handle as an insert for a mold for the handle receiving socket.

5. A process for manufacturing a hand tool, comprising the steps of:

molding a handle receiving socket of a handle adapter about an end of a tool handle;

attaching the handle adapter to a tool head; and removing the handle adapter from another tool head prior to the attaching step.

6. A process for manufacturing a hand tool, comprising the steps of:

molding a handle receiving socket of a handle adapter about an end of a tool handle;

attaching the handle adapter to a tool head; and stamping the tool head from sheet metal stock prior to the attaching step, wherein the stamping step includes the step of creating a foot tread extending the width of the tool head.

7. A process for manufacturing a hand tool, comprising the steps of:

inserting a portion of a tool handle into a mold for a handle adapter;

molding the handle adapter within the mold to form a handle receiving socket about an end of the tool handle, and a base portion; and attaching the base portion of the handle adapter to a tool head;

wherein during the molding step a threaded recess is provided in the base portion of the handle adapter, and wherein the attaching step includes the step of threading a fastener into the threaded recess.

8. The process of claim 7, wherein the threaded recess is smaller in cross-section than the threaded fastener so as to lock the fastener therein.

9. A process for manufacturing a hand tool, comprising the steps of:

inserting a portion of a tool handle into a mold for a handle adapter;

molding the handle adapter within the mold to form a handle receiving socket about an end of the tool handle, and a base portion;

attaching the base portion of the handle adapter to a tool head; and inserting a shim between the handle adapter and the tool head prior to the attaching step.

10. A process for manufacturing a hand tool, comprising the steps of:

inserting a portion of a tool handle into a mold for a handle adapter;

molding the handle adapter within the mold to form a handle receiving socket about an end of the tool handle, and a base portion;

attaching the base portion of the handle adapter to a tool head; and removing the handle adapter from another tool head prior to the attaching step.

11. The process of claim 7, including the step of stamping the tool head from sheet metal stock prior to the attaching step, wherein the stamping step includes the step of creating a foot tread extending the width of the tool head.

12. A process for manufacturing a hand tool, comprising the steps of:

stamping a tool head from sheet metal stock;

inserting a portion of a tool handle into a mold for a handle adapter;

molding the handle adapter within the mold to form a handle receiving socket about an end of the tool handle, and a base portion having a threaded recess therein;

inserting a shim between the base portion of the handle adapter and the tool head; and attaching the base portion of the handle adapter to the tool head by threading the fastener into the threaded recess of the base portion, wherein the threaded recess is smaller in cross-section than the threaded fastener so as to lock the fastener therein.

13. The process of claim 12, including the step of removing the handle adapter from another tool head prior to the attaching step.

\* \* \* \* \*